United States Patent
Kishi et al.

(10) Patent No.: US 11,124,261 B2
(45) Date of Patent: Sep. 21, 2021

(54) BAR END MOUNTING STRUCTURE IN HANDLE OF VEHICLE

(71) Applicant: TOYO DENSO KABUSHIKI KAISHA, Minato-ku (JP)

(72) Inventors: Shoji Kishi, Tsurugashima (JP); Takayuki Otani, Tsurugashima (JP); Toshikazu Murata, Tsurugashima (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/724,773

(22) Filed: Dec. 23, 2019

(65) Prior Publication Data

US 2020/0283087 A1 Sep. 10, 2020

(30) Foreign Application Priority Data

Mar. 4, 2019 (JP) .............................. JP2019-038621

(51) Int. Cl.
*B62K 21/12* (2006.01)

(52) U.S. Cl.
CPC ................... *B62K 21/125* (2013.01)

(58) Field of Classification Search
CPC ....... B62K 21/125; B62K 21/12; B62K 21/16
See application file for complete search history.

(56) References Cited

U.S. PATENT DOCUMENTS

| | | | | |
|---|---|---|---|---|
| 4,966,047 A * | 10/1990 | Krauer | ................... | B62K 23/04 74/489 |
| 5,301,570 A * | 4/1994 | Li | ........................ | B62K 21/125 280/278 |
| 2009/0255093 A1* | 10/2009 | Hsu | ........................ | B62K 21/26 16/421 |
| 2014/0260772 A1* | 9/2014 | Dion | ........................ | B62J 23/00 74/551.8 |
| 2019/0092419 A1* | 3/2019 | Heder | .................... | B62K 21/18 |

FOREIGN PATENT DOCUMENTS

| | | |
|---|---|---|
| JP | 02-54794 | 2/1990 |
| JP | 2012-250589 | 12/2012 |
| JP | 2013-006431 | 1/2013 |
| JP | 2014008809 A * | 1/2014 |

* cited by examiner

*Primary Examiner* — Patrick Cicchino
(74) *Attorney, Agent, or Firm* — Cozen O'Connor (57) ABSTRACT

A bar end mounting structure in a handle which is capable of improving the ease of maintenance of a bar end. A handlebar with a hollow shape has an L-shaped groove. The L-shaped groove is comprised of a first groove portion, which is formed in a longitudinal direction of the handlebar in a manner extending from an opening end, and a second groove portion, which is formed in substantially a circumferential direction of the handlebar and is contiguous to the first groove portion. The bar end and the screw support unit are fixed to the handlebar by screwing the screw into the screw support unit in a state in which the projecting portion of the screw support unit is in engagement with the second groove portion.

7 Claims, 7 Drawing Sheets

BAR END MOUNTING STRUCTURE IN HANDLE OF VEHICLE

BACKGROUND OF THE INVENTION

Field of the Invention

The present invention relates to a bar end mounting structure in a handle of a vehicle.

Description of the Related Art

Conventionally, a handle of a vehicle is equipped with a handlebar (handle pipe), and a bar end (grip end) is provided at an end of a handlebar. In general, the bar end is fastened to a screw support provided inside the handlebar with a mounting screw. However, since the screw support is installed in the handlebar by press-fitting or welding, productivity such as ease of mounting is low, and besides, maintenance is not easy. In particular, even when a screw hole in the screw support is damaged by falling of a vehicle or the like, the screw support cannot be easily replaced.

Japanese Laid-Open Patent Publication (Kokai) No. 2013-6431 discloses a handle configured by engaging a stop pin, which projects from an inner weight (screw support), with a through hole of the handlebar and fastening an outer weight (bar end) into a small-diameter portion of the inner weight, which partially projects from the handlebar, by screws. In this handle, a force by which the small-diameter portion and the outer weight are fastened together causes the handlebar to be partially sandwiched by the stop pin and the outer weight.

Japanese Laid-Open Patent Publication (Kokai) No. 2012-250589 discloses an arrangement in which a tongue portion of a mounting member, which is mounted on a nut member (screw support), is engaged with a positioning hole of a handle pipe, and a force by which the nut member and a handle weight (bar end) are fastened together by a weight fixing bolt causes the handle pipe to be sandwiched by the tongue portion and the handle weight. Japanese Laid-Open Patent Publication (Kokai) No. H02-54794 discloses an arrangement in which an expanded portion of a rubber member, which is engaged with a nut (screw support), and a groove of a handlebar are engaged together, and a force by which a nut and a balancing weight (bar end) are fastened together by a bolt causes the handlebar to be sandwiched by the expanded portion and the balancing weight.

According to the arrangement disclosed in Japanese Laid-Open Patent Publication (Kokai) No. 2013-6431, however, assembling is complicated because the stop pin needs to be screwed into the through hole after the stop pin is inserted into the through hole, and in addition, maintenance is not easy because not only the screw but also the stop pin needs to be pulled out so as to remove the inner weight. Moreover, according to the arrangement disclosed in Japanese Laid-Open Patent Publication (Kokai) No. 2012-250589, maintenance is complicated because of the special arrangement in which the nut member, the mounting member, and a dynamic damper are configured as an integrated assembly. Furthermore, according to the arrangement disclosed in Japanese Laid-Open Patent Publication (Kokai) No. H02-54794, it is necessary to form the groove inside the handlebar. In addition, since the expanded portion of the rubber member is fitted in the groove, it is difficult to remove the nut engaged with the rubber member, and hence maintenance is not easy.

SUMMARY OF THE INVENTION

The present invention improves the ease of maintenance of a bar end.

Accordingly, the present invention provides a bar end mounting structure of a handle, comprising: a handlebar that has a hollow shape with an opening end; a screw support unit that has a projecting portion and be inserted into the handlebar; a bar end that is placed on the opening end side of the handlebar; and a screw that is screwed into the screw support unit via the bar end, wherein an L-shaped groove comprised of a first groove portion, which is formed in a longitudinal direction of the handlebar in a manner extending from the opening end, and a second groove portion, which is formed in substantially a circumferential direction of the handlebar and is contiguous to the first groove portion, is formed in the handlebar, and the bar end and the screw support unit are fixed to the handlebar by screwing the screw into the screw support unit in a state in which the projecting portion of the screw support unit is in engagement with the second groove portion.

According to the present invention, the ease of maintenance of the bar end is improved.

Further features of the present invention will become apparent from the following description of exemplary embodiments (with reference to the attached drawings).

DESCRIPTION OF THE EMBODIMENTS

Embodiments of the present invention will now be described with reference to the drawings.

Figure 1:
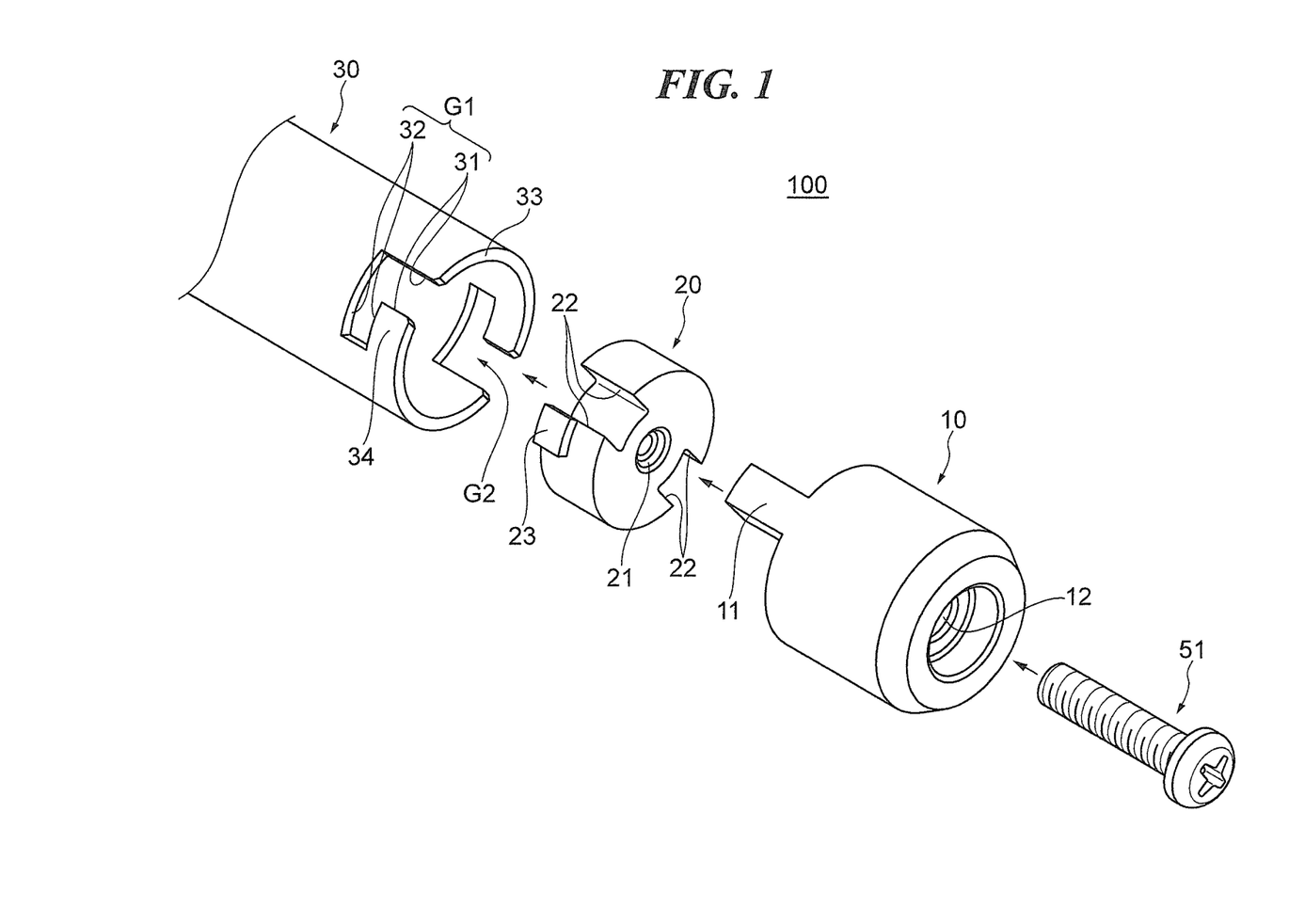
FIG. 1 is an exploded perspective view showing essential parts of a handle to which a bar end mounting structure according to a first embodiment is applied.
Figure 2:
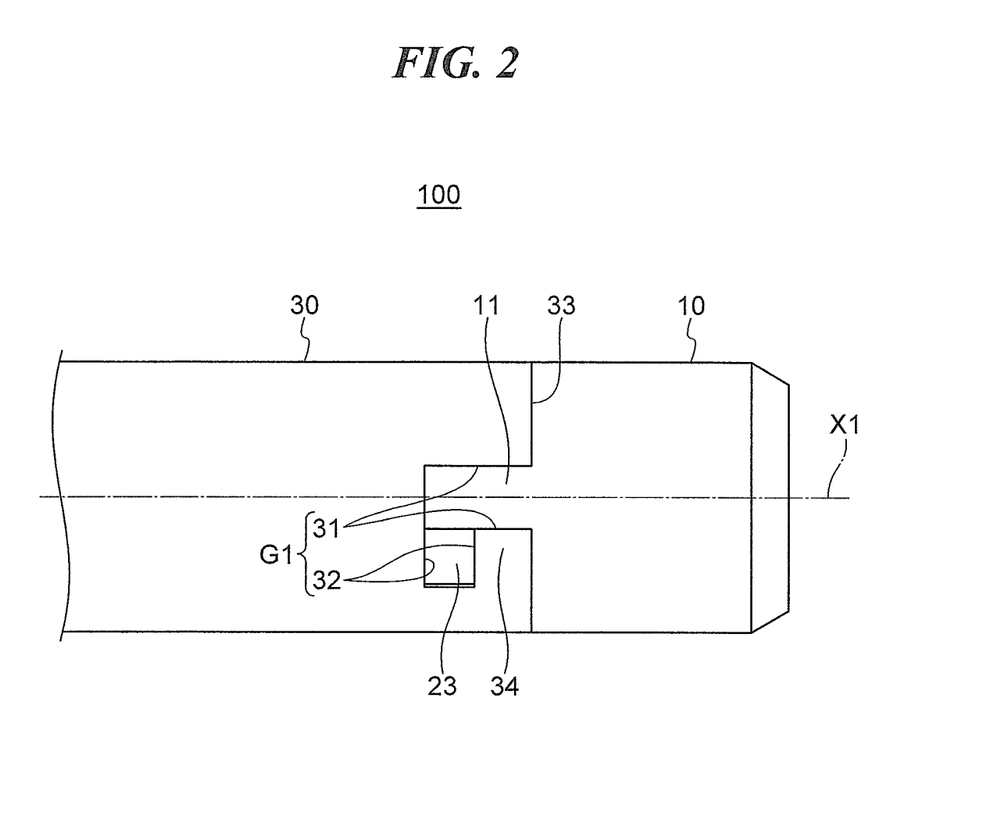
FIG. 2 is a side view showing an end of the handle in an assembled state.

FIG. 1 is an exploded perspective view showing essential parts of a handle to which a bar end mounting structure according to a first embodiment is applied. This handle 100 is installed in, for example, a vehicle. In the present embodiment, the handle 100 on the right-hand side will be described as a typical example, and a left handle and the handle 100 are configured to be symmetrical. The vehicle to which the present embodiment is applied should not necessarily be a two-wheel vehicle, but may also be applied to a three-wheel vehicle and a four-wheel vehicle such as a buggy insofar as they have a handle with rod-shaped ends. FIG. 2 is a side view showing an end portion of the handle 100 in an assembled state.

The handle is comprised mainly of a bar end 10, a screw support unit 20, a handlebar 30, and a screw 51 which are provided near an end of the handle 100. The bar end 10, the screw support unit 20, and the handlebar 30 are configured as an integral unit with metal or resin. The handlebar 30 has a hollow shape (pipe-shaped) whose longitudinal direction is a central axial line X1 and has an opening end 33 in its free end portion. Two L-shaped grooves G (G1, G2) are formed in the handlebar 30. A description will be given of the L-shaped grooves G1 and G2 later.

The screw support unit 20 has groove 22, which is substantially parallel with the central axial line X1, and a projecting portion 23 adjacent to the groove 22 in a circumferential direction. Two pairs of the groove 22 and the projection 23 are formed at locations symmetrical with each other with respect to the central axial line X1 (only one of the projecting portions 23 is illustrated). The projecting portions 23 project outwardly from an outer peripheral surface of the screw support unit 20. A screw hole 21 with which the screw 51 is to be screwed is formed in the center of the screw support unit 20. The screw support unit 20 is inserted into the handlebar 30 except for the projecting portions 23.

The bar end 10 is placed at the opening end 33 side of the handlebar 30. The bar end 10 has two ribs 11 (only one of the ribs 11 is illustrated) which are to be engaged with the respective two grooves 22. The ribs 11 are extended in a direction substantially parallel to the central axial line X1. A hole 12 into which the screw 51 is to be inserted is formed in the center of the bar end 10.

Figure 3:
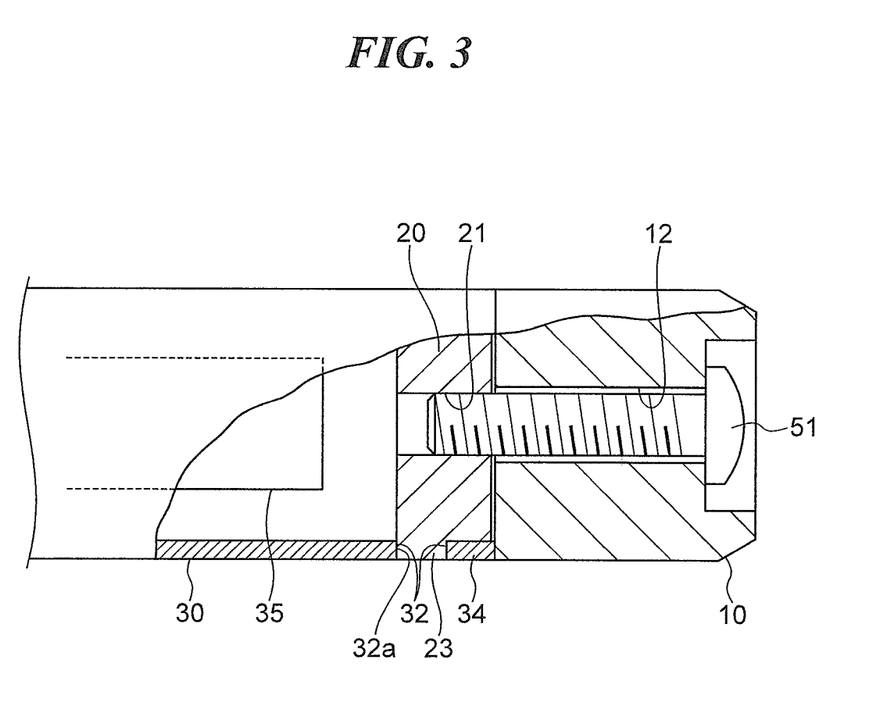
FIG. 3 is a longitudinal cross-sectional view showing the end of the handle in the assembled state.

FIG. 3 is a longitudinal cross-sectional view of the end portion of the handle 100 in the assembled state, taken along the central axial line X1. An electronic component 35 is installed inside the handlebar 30. The electronic component 35 is, for example, a throttle sensor (accelerator position sensor). FIG. 3 shows a partial cross section that passes between the central axial line X1 and the projecting portion 23. A description will be given of the L-shaped grooves G1 and G2 with reference to FIGS. 1 to 3. The L-shaped groove G1 and the L-shaped groove G2 are provided at locations symmetrical with respect to the central axial line X1. They have the same arrangement, and hence only the L-shaped groove L1 will be described below as a typical example.

The L-shaped groove L1 is comprised of a first groove portion 31, which is formed in the longitudinal direction (the direction of the central axial line X1) of the handlebar 30 in a manner extending from the opening end 33, and a second groove portion 32, which is formed in substantially a circumferential direction of the handlebar 30. The L-shaped groove L1 has an L shape when viewed from the side. A width of the first groove portion 31 (a space in the circumferential direction of the handlebar 30) is equal to or greater than a width of the rib 11 of the bar end 10 and is longer than a length of the projecting portion 23 in the circumferential direction of the handlebar 30. The width of the first groove portion 31 is substantially equal to that of the groove 22 in the screw support unit 20. In the longitudinal direction of the handlebar 30, a width of the second groove portion 32 is equal to or greater than the length of the projecting portion 23 of the screw support 23. An end face of the second groove portion 32 which is opposite to the opening end 33 in the longitudinal direction of the handlebar 30 is an end face 32a.

It should be noted that in substantially the circumferential direction of the handlebar 30, a direction in which the second groove portion 32 is extended from the first groove portion 31 in each of the L-shaped grooves G1 and G2 may be opposite to the direction illustrated in FIG. 2. In other words, each of the L-shaped grooves G1 and G2 may have an inverted L shape when viewed from the side. Alternatively, each of the L-shaped grooves G1 and G2 may have an L-shape when viewed from the inside of the handlebar 30.

A description will now be given of how the handle 100 is assembled. First, an operator inserts the screw support unit 20 into the handlebar 30 from the opening end 33 of the handlebar 30. On this occasion, the operator passes the projecting portion 23 of the screw support unit 20 through the first groove portion 31. In the end, the projecting portion 23 abuts against the end face 32a on the rear side of the first groove portion 31 (the end face of the second groove portion 32 which is opposite to the opening end 33), and hence even if the operator takes his or her hand off the screw support unit 20, it does not drop to the inside of the handle 100. After that, the operator rotates the screw support unit 20 relatively to the handle 100 and engages the projecting portion 23 with the second groove portion 32 so that they can fit together (FIG. 2). This brings the screw support unit 20 to a state of being positioned temporarily before screwing, and even if the operator takes his or her hand off the screw support unit 20, its position is maintained. The first groove portion 31 thus functions as a mounting guide for the screw portion 20, and the second groove portion 32 performs the function of temporarily positioning the screw support unit 20. In the temporarily positioned state, the position of the first groove portion 31 and the position of the groove 22 in the screw support unit 20 substantially coincide in the circumferential direction of the handlebar 30.

Next, the operator inserts the rib 11 of the bar end 10 into the first groove portion 31 and the groove 22 and opposes the bar end 10 to the opening end 33 of the handlebar 30. Then, the operator screws the screw 51 into the screw hole 21 of the screw support unit 20 via the hole 12 of the bar end 10. This causes a body portion 34 of the handlebar 30, which is located between the second groove portion 32 and the bar end 10, to be sandwiched between the projecting portion 23 and the bar end 10. As a result, the bar end 10 and the screw support unit 20 are fixed to the handlebar 30 (FIG. 2, FIG. 3). The fixing by sandwiching is done at the same time for portions corresponding to both of the L-shaped grooves G1 and G2. Therefore, assembly work is easy.

To perform maintenance for replacement of a broken-down part or the like, the operator should unscrew the screw 51, remove the bar end 10 from the handlebar 30, and pull out the screw support unit 20 from the handlebar 30 after rotating it a little. Therefore, maintenance work is easy.

According to the present embodiment, when the screw 51 is screwed into the hole 21 in the state in which the projecting portion 23 is in engagement with the second groove portion 32, the body portion 34 of the handlebar 30 is sandwiched by the projecting portion 23 and the bar end 10, causing the bar end 10 and the screw support unit 20 to be fixed to the handlebar 30. This improves the ease of mounting and the ease of maintenance of the bar end 10.

Moreover, since the projecting portion 23 is formed integrally with the screw support unit 20, the number of components is reduced, and it is easy to temporarily position the screw support unit 20. This contributes to an improvement in the ease of mounting.

Furthermore, in the temporarily positioned state and the assembled state, since the rib 11 of the bar end 10 is fitted in the first groove portion 31, the screw support unit 20 is prevented from accidentally rotating to disengage the projecting portion 23 and the second groove portion 32 from each other. This effect lasts in not only the temporarily positioned state of the screw support unit 20 but also the mounted state of the bar end 10. Thus, the temporarily positioned state of the screw support unit 20 or the mounted state of the bar end 10 can be stably maintained.

Moreover, since there are plural pairs of the projecting portion 23 and the L-shaped groove G in the circumferential direction of the handlebar 30, the mounted state of the bar end 10 can be stably maintained. It should be noted that the number of pairs of the projecting portion 23 and the L-shaped groove G may be three or more.

It should be noted that from the standpoint of only improving the ease of mounting and the ease of maintenance of the bar end 10 is focused, the number of pairs of the projecting portion 23 and the L-shaped groove G may be one. Alternatively, one of the L-shaped grooves G1 and G2 in the bar end 10 may be dispensed with the second groove portion 32 (have only the first groove portion 31), and the screw support unit 20 may have two grooves 22 and only one projecting portion 23.

Figure 4:
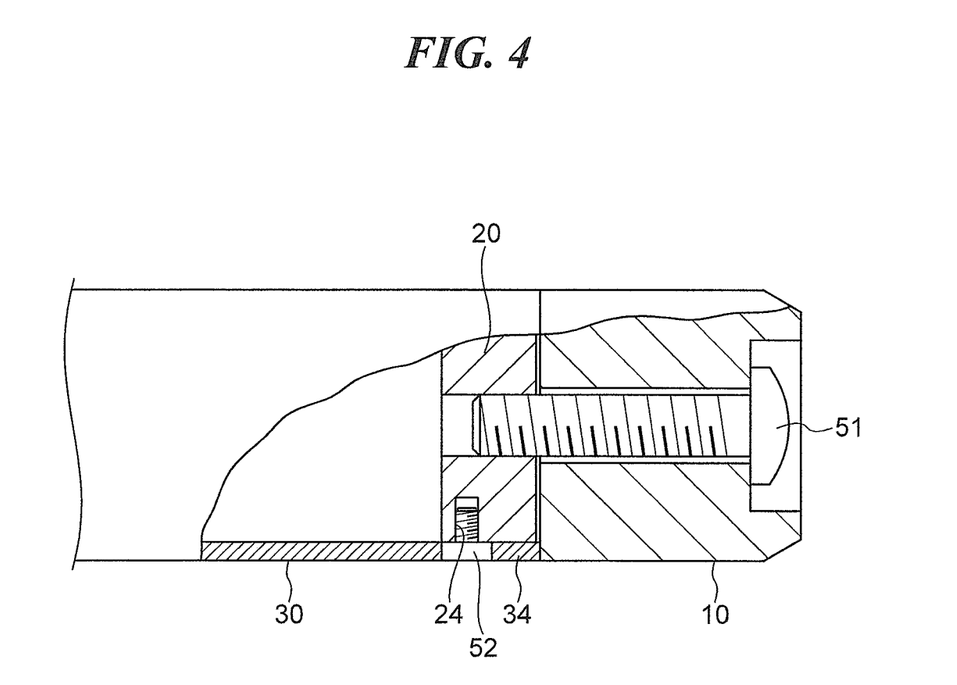
FIG. 4 is a longitudinal cross-sectional view showing an end of a handle according to a variation of the first embodiment.

It should be noted that in the present embodiment, the projecting portion 23 is integrally formed with the screw support unit 20. However, a projecting portion may be configured as a separate body and fixed to the screw support unit 20. For example, referring to a variation shown in FIG. 4, a screw 52 is screwed beforehand into a screw hole 24 provided in the screw support unit 20. A diameter of a head of the screw 52 is equal to that of the projecting portion 23 in the longitudinal direction of the handlebar 30. At the time of mounting, the screw support unit 20 into which the screw 52 has been screwed can be handled in the same manner as the screw support unit 20 having the projecting portion 23 described with reference to FIGS. 1 to 3. This arrangement can also achieve the effect of improving the ease of mounting and the ease of maintenance of the bar end 10. It should be noted that the number of pairs of the screw 52 and the L-shaped groove G may be one or more.

Moreover, even if the bar end 10 is subjected to an external force and displaced to the side on which the electronic component 35 is located, the projecting portion 23 abuts against the end face 32a before the screw support unit 20 abuts against the electronic component 35. Also, even if the bar end 10 is subjected to an external force in the state in which the projecting portion 23 is in contact with the end face 32a, the screw support unit 20 does not abut against the electronic component 35. Therefore, the screw support unit 20 can be prevented from interfering with the electronic component 35 inside the handlebar 30. As a result, a component element inside the handlebar 30 can be protected.

Figure 5:
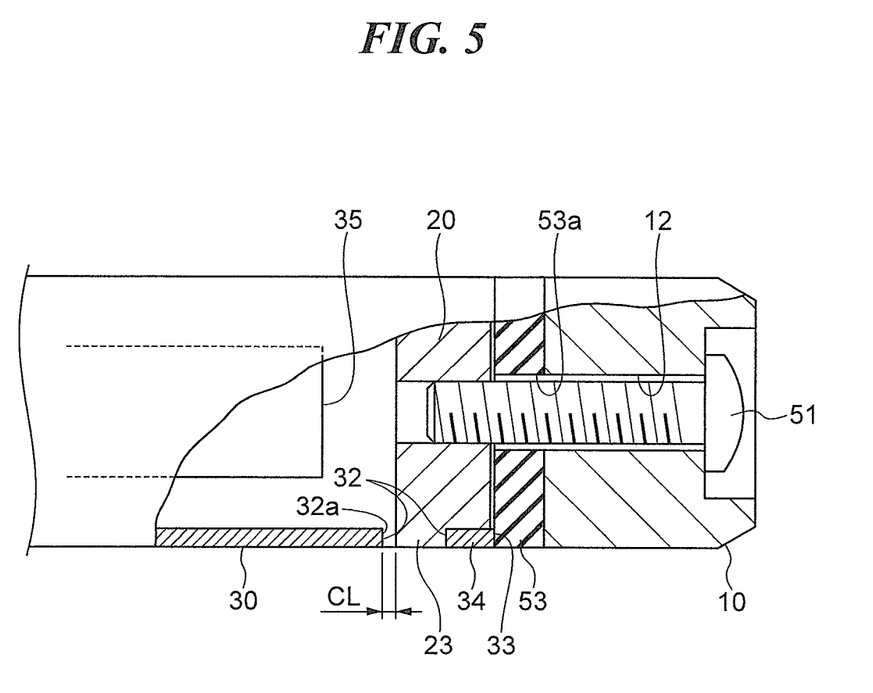
FIG. 5 is a longitudinal cross-sectional view showing an end of a handle according to a second embodiment.

FIG. 5 is a longitudinal cross-sectional view showing an end portion of a handle 100 according to a second embodiment. FIG. 5 corresponds to FIG. 3. The handle 100 of the present embodiment differs from that of the first embodiment in that an elastic member 53 such as rubber is interposed between the bar end 10 and the screw support unit 20, and the other basic arrangements are the same as those of the first embodiment. The elastic member 53 has an annular shape, and a hole 53a which is in communication with the hole 12 of the bar end 10 and into which the screw 51 is to be inserted is formed in the center of the elastic member 53. An outer shape of the elastic member 53 as seen from the direction of the central axial line X1 is substantially the same as the shape of the screw support unit 20 except for the projecting portion 23.

With this arrangement, the same procedure as in the first embodiment is followed until the projecting portion 23 of the screw support unit 20 is engaged with the second groove portion 32. To insert the rib 11 of the bar end 10 into the first groove portion 31 and the groove 22, the operator opposes the bar end 10 to the opening end 33 of the handlebar 30 via the elastic member 53. The operator then screws the screw 51 into the screw hole 21 of the screw support unit 20 via the hole 12 of the bar end 10 and the hole 53a of the elastic member 53a. As a result, the body portion 34 is sandwiched by the projecting portion 23 and the bar end 10 via the elastic member 53, causing the bar end 10, the elastic member 53, and the screw support unit 20 to be fixed to the handlebar 30.

In the present embodiment, a width of the second groove portion 32 is greater than a length of the projecting portion 23 of the screw support unit 20 in the longitudinal direction of the handlebar 30 as shown in FIG. 5. A clearance CL is formed between the end face 32a and the projecting portion 23 in the state in which the bar end 10 and the screw support unit 20 are fixed to the handlebar 30. When the bar end 10 is subjected to an external force in the longitudinal direction of the handlebar 30, the elastic member 53 contracts, resulting in displacement of the screw support unit 20. The contraction of the elastic member 53 makes it less likely that the bar end 10 and the screw support unit 20 get damaged due to the external force of the bar end 10.

The clearance CL is smaller than an amount by which the elastic member 53 is able to contract when the bar end 10 is subjected to an external force in the longitudinal direction of the handlebar 30. Thus, even if the elastic member 53 is caused to contract by the bar end 10 being subjected to an external force, an amount by which the screw support unit 20 is displaced is limited to a predetermined range because the projecting portion 23 abuts against the end face 32a. This prevents the screw support unit 20 from interfering with the electronic component 35 inside the handlebar 30, thus protecting the electronic component 35.

According to the present embodiment, the same effects as those in the first embodiment can be obtained with regard to improvement in the ease of mounting and the ease of maintenance of the bar end 10.

Moreover, according to the present embodiment, the same effects as those in the first embodiment can be obtained with regard to protection of a component element inside the handlebar 30. In particular, the presence of the elastic member 53 allows movement of the screw support unit 20 within a predetermined range in the longitudinal direction of the handlebar 30 when the bar end 30 is subjected to an external force, and therefore, the external force can be elastically received, and a component element inside the handlebar 30 can be more appropriately protected.

Figure 6:
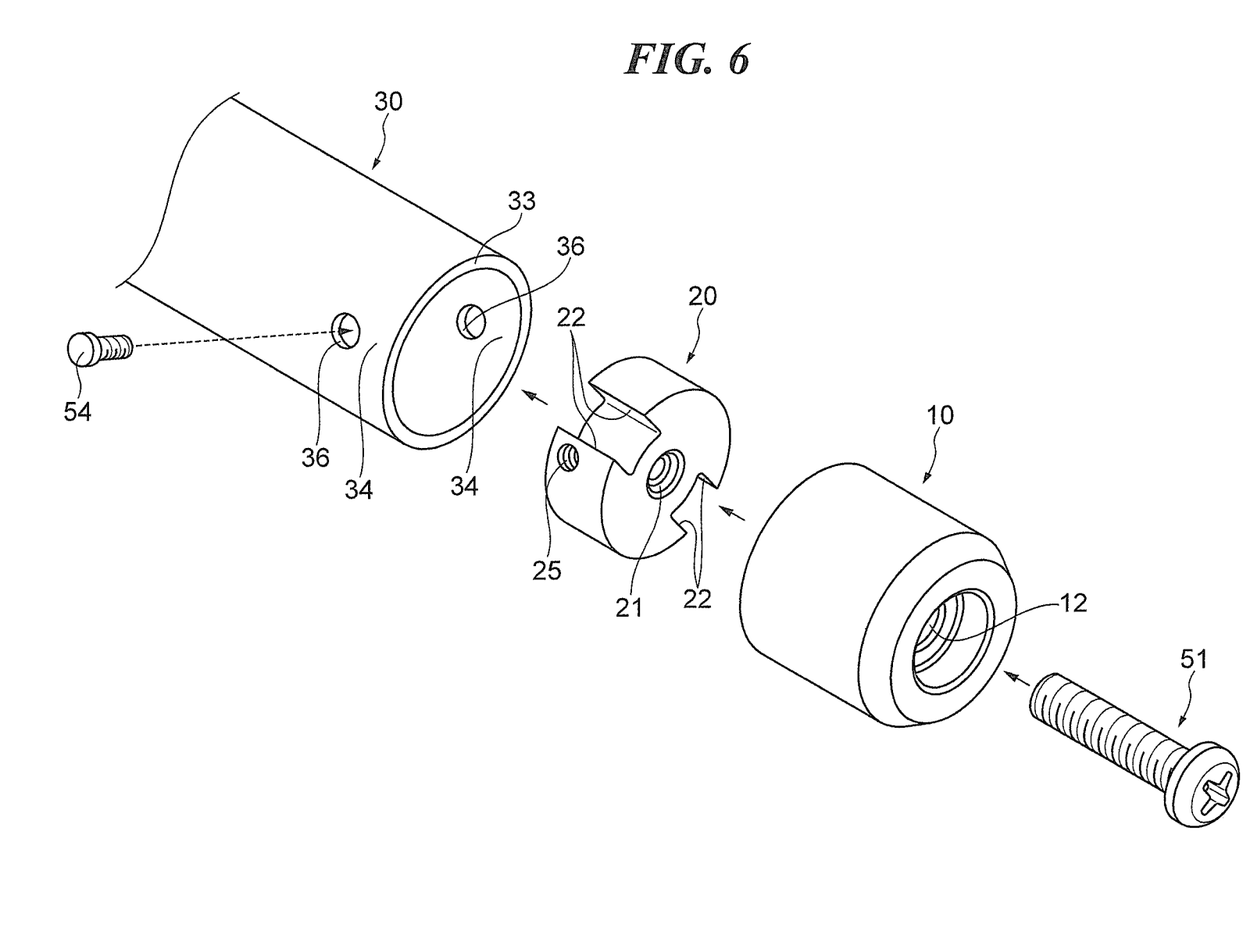
FIG. 6 is an exploded perspective view showing essential parts of a handle according to a third embodiment.

FIG. 6 is an exploded perspective view showing essential parts of a handle according to a third embodiment. In the present embodiment, screws 54 are provided as second screws in addition to the screw 51 that is provided as a first screw. The arrangement of the screw 51 is the same as that of the first embodiment. Compared to the first embodiment, the bar end 10 has no ribs 11. The L-shaped grooves G are not formed in the handlebar 30, and two through holes 36 are laterally formed in the handlebar 30 instead. The thorough holes 36 are formed at the same locations as the respective second groove positions 32 of the L-shaped grooves G1 and G2. The projecting portions 23 are not formed in the screw support unit 20, and instead of them, screw holes 25 (second screw holes) corresponding to the respective through holes 36 are formed in the screw support unit 20. The screws 54 are screwed into the screw hole 25 via the through holes 36. The other arrangements are the same as those of the first embodiment.

A description will now be given of how the handle 100 is assembled. First, the operator inserts the screw support unit 20 into the handlebar 30 from the opening end 33 of the handlebar 30. It should be noted that a jig or the like for nipping the two grooves 22 may be used so as to hold the screw support unit 20. Next, the operator aligns the screw holes 25 with the corresponding through holes 36. In this state, the operator screws the screws 54 into the corresponding screw holes 25 via the respective through holes 36. Then, the operator screws the screw 51 into the screw hole 21 (first screw hole) of the screw support unit 20 via the hole 12 of the bar end 10. As a result, the body portions 34 of the handlebar 30, which are located between the through holes 36 and the bar end 10, are sandwiched by the corresponding screws 54 and the bar end 10, causing the bar end 10 and the screw support unit 20 to be fixed to the handlebar 30.

To perform maintenance, the operator has only to unscrew the screw 51, remove the bar end 10 from the handlebar 30, unscrew the screws 54, and pull out the screw support unit 20 from the handlebar 30. Therefore, maintenance is easy as compared to the prior art.

According to the present embodiment, the same effects as those in the first embodiment can be obtained with regard to improvement in the ease of maintenance of the bar end 10.

Figure 7:
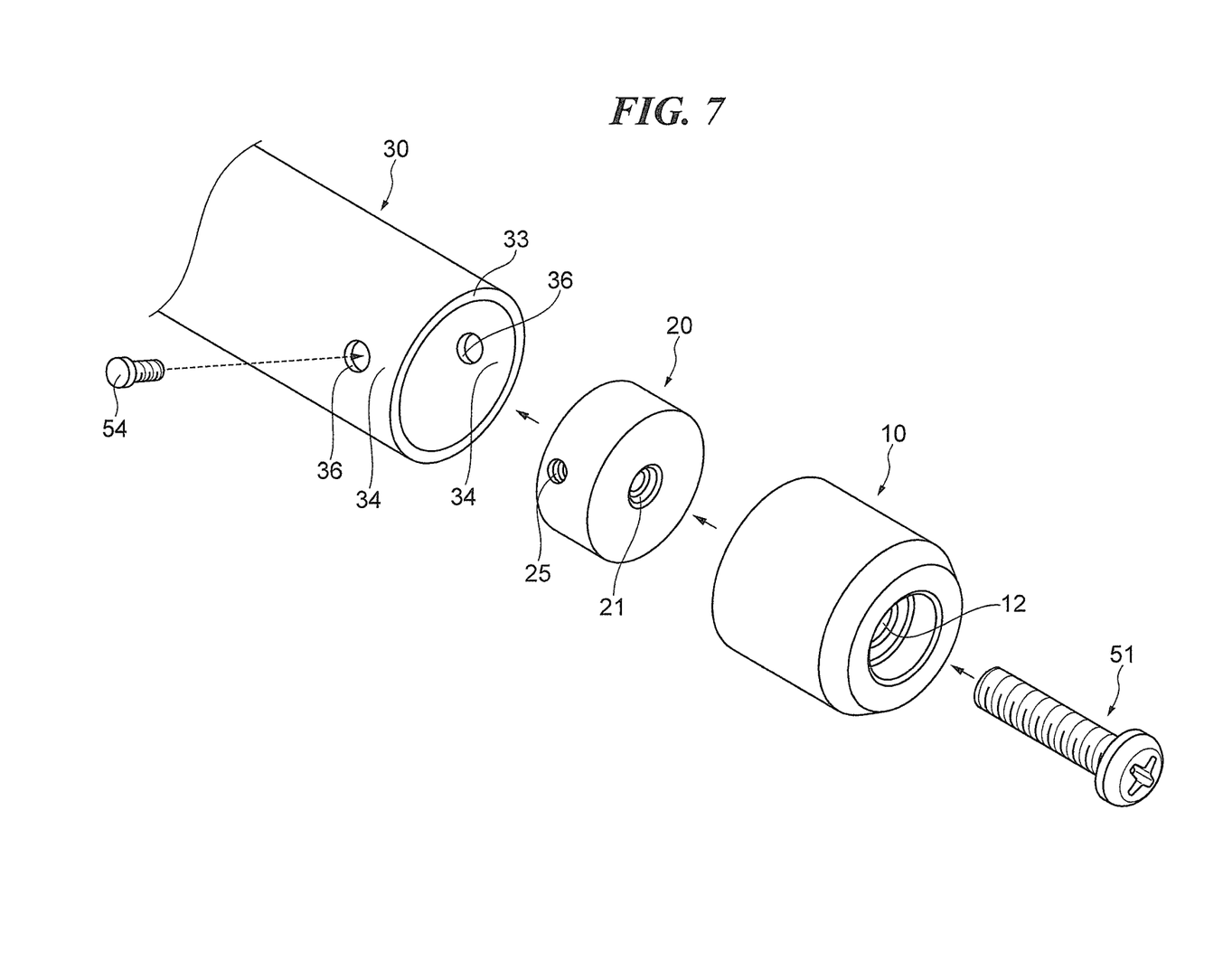
FIG. 7 is an exploded perspective view showing an end of a handle according to a variation of the third embodiment.

It should be noted that in the present embodiment, the screw support unit 20 may be dispensed with the two grooves 22 as in a variation shown in FIG. 7. To assemble the screw support unit 20 with this arrangement, first, the operator screws the screw 51 into the screw hole 21 (the first screw hole) of the screw support unit 20 via the hole 12 of the bar end 10. Next, the operator inserts the screw support unit 20 into the handlebar 30 from the opening end 33 of the handlebar 30. Then, the operator aligns the screw holes 25 with the corresponding through holes 36. In this state, the operator screws the screws 54 into the corresponding screw holes 25 via the respective through holes 36.

To perform maintenance, the operator has only to unscrew the screws 54, pull out the screw support unit 20 from the handlebar 30, remove the bar end 10 from the handlebar 30, and then unscrew the screw 51. Therefore, maintenance is easy as compared to the prior art.

It should be noted that in the third embodiment and its variation, the number of pairs of through holes 36, screw holes 25, and screws 54 should not necessarily be two, but may be one or three or more.

While the present invention has been described in detail with reference to the preferred embodiments thereof, it is to be understood that the invention is not limited to those particular embodiments. The prevent invention encompasses various forms that do not depart from its spirit. The embodiments described above can be combined together as appropriate.

Other Embodiments

This application claims the benefit of Japanese Patent Application No. 2019-038621, filed Mar. 4, 2019 which is hereby incorporated by reference herein in its entirety.

What is claimed is:

1. A bar end mounting structure in a handle, comprising:
a handlebar configured to have a hollow shape with an opening end;
a screw support unit configured to have a projecting portion and be inserted into the handlebar;
a bar end configured to be placed on the opening end side of the handlebar; and
a screw configured to be screwed into the screw support unit via the bar end,
wherein an L-shaped groove formed in the handlebar comprises a first groove portion that is formed in a longitudinal direction of the handlebar in a manner extending from the opening end, and a second groove portion that is formed in substantially a circumferential direction of the handlebar and contiguous to the first groove portion,
the bar end and the screw support unit are fixed to the handlebar by screwing the screw into the screw support unit in a state in which the projecting portion of the screw support unit is in engagement with the second groove portion, and
the bar end has a rib that is to be fitted into the first groove portion.

2. The bar end mounting structure of the handle according to claim 1, wherein the projecting portion is formed integrally with the screw support unit.

3. The bar end mounting structure of the handle according to claim 1, wherein the projecting portion is another screw that is fixed to the screw support unit by screwing.

4. The bar end mounting structure of the handle according to claim 1, further comprising an electronic component installed in the handlebar so as to have a component end face facing the bar end,
wherein an end face of the second groove portion is arranged opposite to the opening end and closer to the bar end than the component end face, in a case in which the bar end is subjected to an external force in the longitudinal direction of the handlebar.

5. The bar end mounting structure of the handle according to claim 1, wherein an elastic member is interposed between the bar end and the screw support unit, and
in a state in which the bar end and the screw support unit fixed to the handlebar, a clearance smaller than an amount by which the elastic member is able to contract when the bar end is subjected to an external force in the longitudinal direction of the handlebar is formed between an end face of the second groove portion, which is opposite to the opening end, and the projecting portion.

6. The bar end mounting structure of the handle according to claim 1, wherein in the circumferential direction of the handlebar, there are plural pairs of the projecting portion and the L-shaped groove.

7. A bar end mounting structure of a handle, comprising:
a handlebar configured to have a hollow shape with an opening end and a thorough hole that is laterally formed;
a screw support unit configured to have a first screw hole and a second screw hole and to be inserted into the handlebar;
a bar end configured to be placed on the opening end side of the handlebar; and
a first screw configured to be screwed into the first screw hole of the screw support unit via the bar end,
wherein the bar end and the screw support unit are fixed to the handlebar by screwing the first screw into the first screw hole, screwing the second screw into the second screw hole of the screw support unit via the through hole of the handlebar, and making a portion of the handlebar between the through hole and the bar end, sandwiched by the second screw and the bar end with a lateral end face of the opening end of the handlebar longitudinally abutting against a lateral end face of the bar end.

* * * * *